(12) United States Patent
Wada (10) Patent No.: US 11,750,912 B2
(45) Date of Patent: Sep. 5, 2023

(54) MAIN SUBJECT TRACKING AND PRIORITIZATION USING DEPTH AND SUCCESSIVE TEMPORAL LOCATION PROXIMITY

(71) Applicant: CANON KABUSHIKI KAISHA, Tokyo (JP)

(72) Inventor: Akiko Wada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 17/341,042

(22) Filed: Jun. 7, 2021

(65) Prior Publication Data
US 2021/0392264 A1     Dec. 16, 2021

(30) Foreign Application Priority Data

Jun. 12, 2020   (JP) ................................. 2020-102514

(51) Int. Cl.
*H04N 23/611*  (2023.01)
*G06T 7/70*    (2017.01)
(Continued)

(52) U.S. Cl.
CPC ........... *H04N 23/611* (2023.01); *G06T 7/248* (2017.01); *G06T 7/50* (2017.01); *G06T 7/70* (2017.01);
(Continued)

(58) Field of Classification Search
CPC .......... H04N 5/23219; H04N 5/23212; H04N 5/232121; H04N 5/232127;
(Continued)

(56) References Cited

U.S. PATENT DOCUMENTS 9,818,202 B2 * 11/2017 Masuda ............. H04N 5/36961
10,027,883 B1 *  7/2018 Kuo ................... H04N 5/23293
(Continued)

FOREIGN PATENT DOCUMENTS

CN  109076190 A  * 12/2018  ............... G06K 9/00
CN  110598559 B  *  8/2022  ......... G06K 9/00355
(Continued)

OTHER PUBLICATIONS

Yu Song, Haijun Zhou and Xiongchang Pang, "Detecting objects in complex urban area using depth information," 2010 IEEE International Conference on Information Theory and Information Security, 2010, pp. 1111-1114, doi: 10.1109/ICITIS.2010.5689748. (Year: 2010).*

*Primary Examiner* — Michael Robert Cammarata
(74) *Attorney, Agent, or Firm* — CANON U.S.A., INC. IP Division (57) ABSTRACT

An apparatus comprises a detection unit detecting an object from an image acquired by a capturing unit; and a determination unit that determines whether or not the object is the same as a main object, wherein the determination unit includes a first determination unit that determines whether or not coordinates of the object candidate and coordinates of the main object satisfy a distance condition; a second determination unit that determines whether or not a difference between the object candidate and the main object is within a predetermined range; and a third determination unit that determines whether or not the first and second determination units have determined in the affirmative a predetermined number of times in a row, and the determination unit determines whether transfer of the main object has occurred based on determination results of the first to third determination units.

15 Claims, 8 Drawing Sheets

(51) Int. Cl.
  *G06T 7/50*   (2017.01)
  *H04N 23/67*  (2023.01)
  *G06T 7/246*  (2017.01)
(52) U.S. Cl.
  CPC ... *H04N 23/67* (2023.01); *G06T 2207/30201* (2013.01)
(58) Field of Classification Search
  CPC ......... H04N 5/23218; H04N 5/232218; H04N 5/232219; H04N 23/611; H04N 23/67; G06T 7/50; G06T 7/248; G06T 7/337; G06T 7/70; G06T 2207/30201
  See application file for complete search history.

(56) References Cited

U.S. PATENT DOCUMENTS

| | | | | |
|---|---|---|---|---|
| 10,277,831 | B2* | 4/2019 | Shingu | H04N 5/247 |
| 10,438,372 | B2* | 10/2019 | Furuhashi | G06T 7/557 |
| 11,625,923 | B2* | 4/2023 | Mirza | G06T 7/292 |
| | | | | 382/103 |
| 2010/0053358 | A1* | 3/2010 | Kodama | G06T 7/248 |
| | | | | 348/222.1 |
| 2012/0206619 | A1* | 8/2012 | Nitta | H04N 5/232945 |
| | | | | 348/222.1 |
| 2013/0215319 | A1* | 8/2013 | Tomita | G06T 1/00 |
| | | | | 382/218 |
| 2014/0176784 | A1* | 6/2014 | Hongu | H04N 5/232123 |
| | | | | 348/349 |
| 2015/0016683 | A1* | 1/2015 | Kinoshita | H04N 5/23219 |
| | | | | 382/103 |
| 2016/0330369 | A1* | 11/2016 | Corcoran | G06V 40/161 |
| 2017/0220894 | A1* | 8/2017 | Kuzuya | H04N 7/18 |
| 2020/0084369 | A1* | 3/2020 | Kimishima | H04N 5/23212 |
| 2020/0159222 | A1* | 5/2020 | Mao | G06T 7/593 |
| 2020/0336671 | A1* | 10/2020 | Lee | H04N 5/23219 |
| 2021/0124912 | A1* | 4/2021 | Lee | G06V 40/173 |
| 2021/0124927 | A1* | 4/2021 | Mirza | G06T 7/248 |
| 2021/0216788 | A1* | 7/2021 | Mirza | G06T 7/246 |
| 2021/0366131 | A1* | 11/2021 | Matsuda | G06V 40/10 |

FOREIGN PATENT DOCUMENTS

| | | | | |
|---|---|---|---|---|
| JP | 2013-228930 A | | 11/2013 | |
| JP | 2019-008075 A | | 1/2019 | |
| JP | 6521626 B2 | * | 5/2019 | ......... G06K 9/00241 |
| JP | 6785481 B1 | * | 11/2020 | ......... G06K 9/00228 |

* cited by examiner

FIG. 2

FIG. 3A
THING DETECTION → FACE DETECTION

FIG. 3B
ENTIRE BODY DETECTION → FACE DETECTION

FIG. 3C
THING DETECTION → ENTIRE BODY DETECTION

| AF RELIABILITY | TRACKING RELIABILITY | STILL | MOVEMENT | |
|---|---|---|---|---|
| HIGH | HIGH | NECESSITY LOW | NECESSITY LOW | 601 |
| HIGH | LOW | NECESSITY LOW | NECESSITY HIGH | 602 |
| LOW | HIGH | NECESSITY LOW | NECESSITY HIGH | |

| TRANSITION OF OBJECT | | CAN OBTAIN DISTANCE INFORMATION | CANNOT OBTAIN DISTANCE INFORMATION | |
|---|---|---|---|---|
| | | | TRANSFER NECESSITY HIGH | TRANSFER NECESSITY LOW |
| XY RANGE CONDITION | THING TRACKING → FACE | FACE FRAME 3 × 10 (ENTIRE BODY) | FACE FRAME 3 × 8 (ABOVE KNEE) | FACE FRAME 3 × 6 (ABOVE WAIST) |
| | ENTIRE BODY TRACKING → FACE | ENTIRE BODY DETECTION RANGE × 1.5 TIMES | ENTIRE BODY DETECTION RANGE × 1.2 TIMES | ENTIRE BODY DETECTION RANGE × 1 TIME |

FIG. 9B

| | CAN OBTAIN DISTANCE INFORMATION | CANNOT OBTAIN DISTANCE INFORMATION | |
|---|---|---|---|
| | | TRANSFER NECESSITY HIGH | TRANSFER NECESSITY LOW |
| TIME CONDITION | 1 TIME | 5 TIMES | 10 TIMES |

MAIN SUBJECT TRACKING AND PRIORITIZATION USING DEPTH AND SUCCESSIVE TEMPORAL LOCATION PROXIMITY

BACKGROUND OF THE DISCLOSURE

Field of the Disclosure

The aspect of the embodiments relates to an image capturing apparatus, a control method for the same, and a non-transitory computer-readable storage medium.

Description of the Related Art

There is a commonly known image processing method for automatically detecting a specific object pattern (for example, a region of a human face) from an image. For example, an image capturing apparatus such as a digital camera detects a specific object region from a captured image, and optimizes the focus and exposure by using the results of the detection as a control target. The image capturing apparatus performs tracking processing so as to be able to continuously track the same object regardless of changes in the position and shape of the object over time. There are two methods for such tracking processing. One is a method of comparing the results of the detection of captured images in time series, and tracking the detected objects with high correlation. The other is a tracking method that employs template matching to extract feature values of the captured images and track a region where the degree of matching of the feature values of the captured images is high.

Recently, technology has been evolving to make it easier to capture an object that a user is aiming at, by expanding the range of types of objects that are to be automatically detected, such as, not only humans' face regions, but also the entire bodies of humans, and objects other than humans (for example, animals).

However, in a scene where it is difficult to detect the object to be captured due to the small size of the object or the object not facing the front, for example, the tracking method that employs template matching may be used to track the object to be tracked, after detecting a part of the body as a "thing". There is an issue in that the accuracy of tracking is poor at that time. Therefore, a situation arises in which the tracking position is not stable due to changes in the shape and color of the object to be tracked, or another object with similar color and brightness is erroneously tracked, and the accuracy of tracking is poor compared to tracking using face detection.

In such a situation, if the object to be captured becomes detectable during the tracking performed using the template matching method, it is desirable to be able to continue tracking after switching to the object to be captured for which the accuracy of tracking is higher.

For such situations, Japanese Patent Laid-Open No. 2013-228930 (hereinafter referred to as Document 1) discloses comparing estimated positions of face detection regions respectively detected by a face detection unit and another detection means (for example, human body detection) to perform correlation determination regarding whether or not the objects are the same. Document 1 proposes a method of selecting an estimated region from either the result of the face detection or the result of the human body detection as an object detection region according to the result of the correlation determination. Thus, even when the face cannot be detected, the accuracy of tracking is improved by using the result of another detection such as the human body detection together.

Japanese Patent Laid-Open No. 2019-8075 (hereinafter referred to as Document 2) proposes a method according to which, when identifying a region of the same object in a plurality of frames of images captured in chronological order, determination is performed considering that the region should have the same color as the object in the previous frame, and a defocus amount should be within a predetermined range.

However, according to Document 1, when the face detection unit and the other detection means perform correlation determination regarding whether the objects are the same, the degree of correlation is calculated based on the positions and sizes of the estimated regions respectively detected by the face detection unit and the other detection means, and therefore there is an issue in that another object that has temporarily passed by the front side or rear side of the object that is aimed at, or a face that has been erroneously detected in the background or the like, is also erroneously detected as having a high degree of correlation.

In addition, although objects at different distances are not to be determined as the same object in the Document 2, Document 2 does not show a method for addressing the case in which distance information cannot be obtained.

SUMMARY OF THE DISCLOSURE

According to a first aspect of the embodiments, there is provided an apparatus that has a capturing unit that captures an image at a predetermined frame rate, the apparatus comprising:

a detection unit that detects an object that is a candidate of a main object, from an image in a current frame acquired by the capturing unit; and an object determination unit that performs processing to determine whether or not the detected object is the same as the main object, and determines an object that is determined as being the same as the main object, as a main object in the current frame, wherein the object determination unit includes:

a first determination unit that determines whether or not coordinates of the object candidate and coordinates of the main object in a two-dimensional space of an image in the current frame detected by the detection unit satisfy a distance condition that is based on respective types of the objects;

a second determination unit that determines whether or not a difference between the object candidate and the main object in the current frame detected by the detection unit, in a distance from the apparatus, is within a predetermined range; and a third determination unit that determines whether or not the first determination unit and the second determination unit have determined in the affirmative a predetermined number of times in a row, and the main object determination unit determines that transfer of the main object has occurred if the first determination unit and the second determination unit have determined in the affirmative the predetermined number of times in a row, and determines an object that has a predetermined degree of priority in an image in the current frame, as a main object if any of the first to third determination units determines in the negative.

According to a second aspect of the embodiments, there is provided a method for controlling an apparatus that has a capturing unit that captures an image at a predetermined frame rate, the method comprising:

detecting an object that is a candidate of a main object, from an image in a current frame acquired by the image capturing unit; and performing processing to determine whether or not the detected object is the same as the main object, and determining an object that is determined as being the same as the main object, as a main object in the current frame, wherein the performing includes:

determining whether or not coordinates of the object candidate and coordinates of the main object in a two-dimensional space of an image in the current frame detected in the detecting satisfy a distance condition that is based on respective types of the objects;

determining whether or not a difference between the object candidate and the main object in the current frame detected in the detecting, in a distance from the apparatus, is within a predetermined range; and determining whether or not the determinings have determined in the affirmative a predetermined number of times in a row, and the performing determines that transfer of the main object has occurred if the determining determines that the determinings have determined in the affirmative the predetermined number of times in a row, and determines an object that has a predetermined degree of priority in an image in the current frame, as a main object if any of the determinings determines in the negative.

According to a third aspect of the embodiments, there is provided a non-transitory computer-readable storage medium storing a program which, when read and executed by a processor in an apparatus having a capturing unit that captures an image at a predetermined frame rate, causes the apparatus to execute a method for controlling the apparatus, the method comprising:

detecting an object that is a candidate of a main object, from an image in a current frame acquired by the capturing unit; and performing processing to determine whether or not the detected object is the same as the main object, and determining an object that is determined as being the same as the main object, as a main object in the current frame, wherein the performing includes:

determining whether or not coordinates of the object candidate and coordinates of the main object in a two-dimensional space of an image in the current frame detected in the detecting satisfy a distance condition that is based on respective types of the objects;

determining whether or not a difference between the object candidate and the main object in the current frame detected in the detecting, in a distance from the apparatus, is within a predetermined range; and determining whether or not the determinings have determined in the affirmative a predetermined number of times in a row, and the performing determines that transfer of the main object has occurred if the determining determines that the determinings have determined in the affirmative the predetermined number of times in a row, and determines an object that has a predetermined degree of priority in an image in the current frame, as a main object if any of the determinings determines in the negative.

Further features of the disclosure will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the disclosure. Multiple features are described in the embodiments, but limitation is not made a disclosure that requires all such features, and multiple such features may be combined as appropriate. Furthermore, in the attached drawings, the same reference numerals are given to the same or similar configurations, and redundant description thereof is omitted.

First Embodiment

Figure 1:
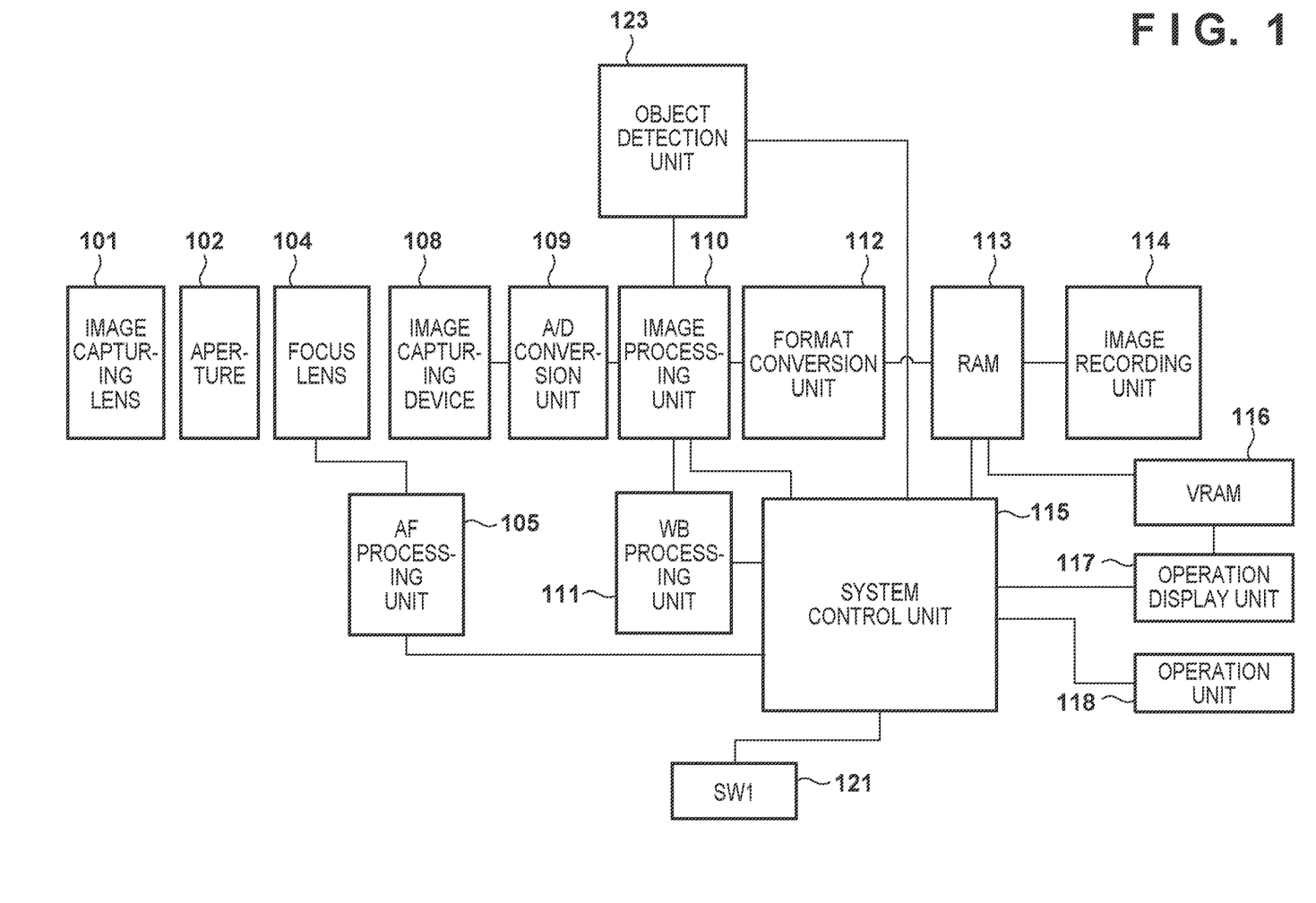
FIG. 1 is a block diagram showing a configuration of an automatic focusing device according to an embodiment.

FIG. 1 is a block configuration diagram for an image capturing apparatus to which an embodiment is applied, which is typically a digital camera. The image capturing apparatus includes an image capturing lens 101, an aperture 102, a focus lens 104, an AF processing unit 105, an image capturing device 108, an A/D conversion unit 109, an image processing unit 110, an WB (White Balance) processing unit 111, a format conversion unit 112, a RAM 113, and an image recording unit 114. An electronic camera includes a system control unit 115, a VRAM 116, an operation display unit 117, an operation unit 118, a switch 121, and an object detection unit 123.

The system control unit 115 includes a CPU, a ROM that stores programs to be executed by the CPU and various setting values, and a RAM that is to be used by the CPU as a work area. The CPU executes the program stored in the ROM, and controls the constituent elements shown in FIG. 1. Note that one or more of the constituent elements in FIG. 1 may be realized by using the CPU of the system control unit 115 (i.e., by using software).

The image capturing lens 101 includes a zoom mechanism, and forms an optical image of an object on the image capturing device 108. The aperture 102 controls the amount of light incident through the image capturing lens 101 and adjusts the depth of field. The focus lens 104 focuses an optical image that has passed through the image capturing lens 101 and the aperture 102 on the image capturing surface of the image capturing device 108. The AF processing unit 105 drives the focus lens 104 according to a control signal from the system control unit 115.

The image capturing device 108 functions as a light receiving means or a photoelectric conversion means, and converts an optical image formed on the imaging capturing surface into an electric signal. The A/D conversion unit 109 converts a signal from the image capturing device 108 into a digital signal. The A/D conversion unit 109 includes a CDS (Correlated Double Sampling processing) circuit that removes noise, and a nonlinear amplifier circuit that performs processing before A/D conversion.

The image processing unit 110 performs various kinds of processing on the captured image data from the A/D conversion unit 109. The image processing unit 110 includes a brightness calculation unit that calculates the brightness of an object in the captured image, and an extraction unit that extracts signal components in a specific frequency band from an output from the brightness calculation unit.

The WB processing unit 111 performs processing related to the white balance of image data that has passed through the image processing unit 110, under the control of the system control unit 115. The format conversion unit 112 converts the format of the image data that has passed through the image processing unit 110. This conversion includes processing related to encoding and decoding as well. Therefore, the format conversion unit 112 also performs decoding processing on encoded image data that is recorded on a recording medium. RAM113 is a writable memory that can be accessed at high speed, and is an SRAM, a DRAM, or the like. The image recording unit 114 functions as an interface with a non-volatile recording medium such as an SD card, performs recording processing on the recording medium, and reads out the image data recorded thereon.

The VRAM 116 is a memory that holds image data that is to be displayed. The operation display unit 117 displays the image developed on the VRAM 116, performs display for operation assistance, and also displays the state of the camera, as well as an image capturing screen and a focus detection region at the time of image capturing.

The operation unit 118 includes various switches and buttons, and also includes a touch panel, and so on, and has the function of transmitting a user's operation to the system control unit 115.

The switch 121 is an image capturing standby switch (also referred to as SW1) that is a focus position confirmation indicating means for performing image capturing standby operations such as AF and AE. As a result of the switch 121 (SW1) being operated, the focus position for image capturing performed by the focus lens 104 is confirmed.

The object detection unit 123 detects various kinds of objects from image data that has been acquired through the processing performed by the image processing unit 110, acquires one or more pieces of information (type, position, size, reliability, and distance) regarding the detected objects, and also detects a main object that is to be processed by the AF processing unit 105 and the WB processing unit 111.

The object detection unit 123 further performs tracking processing to track the same object as the main object in images that are consecutive in time series. Tracking processing is performed by first determining whether or not the objects in the currently captured frame images include an object that is highly correlated with the previous main object, based on object information (type, position, size, reliability, and distance), and tracking the highly correlated object as the main object. If an object that is highly correlated with the previous main object is not found in the objects in the currently captured frames, the object detection unit 123 extracts the respective feature values (such as colors) of the region of the previous main object and the currently captured images, and tracks a region where the degree of matching with the feature value of the previous object detection region is high as the main object.

The RAM 113 is used as a high-speed buffer that serves as a temporary image storage means, or as a work memory for image compression/decompression. Examples of the operation unit 118 include the following: menu switches used to make various settings such as the settings of the image capturing function of the image capturing apparatus and the settings for image playback; a zoom lever for instructing the zoom the image capturing lens to perform a zoom operation, and an operation mode switch for switching between an image capturing mode and a playback mode.

Figure 2:
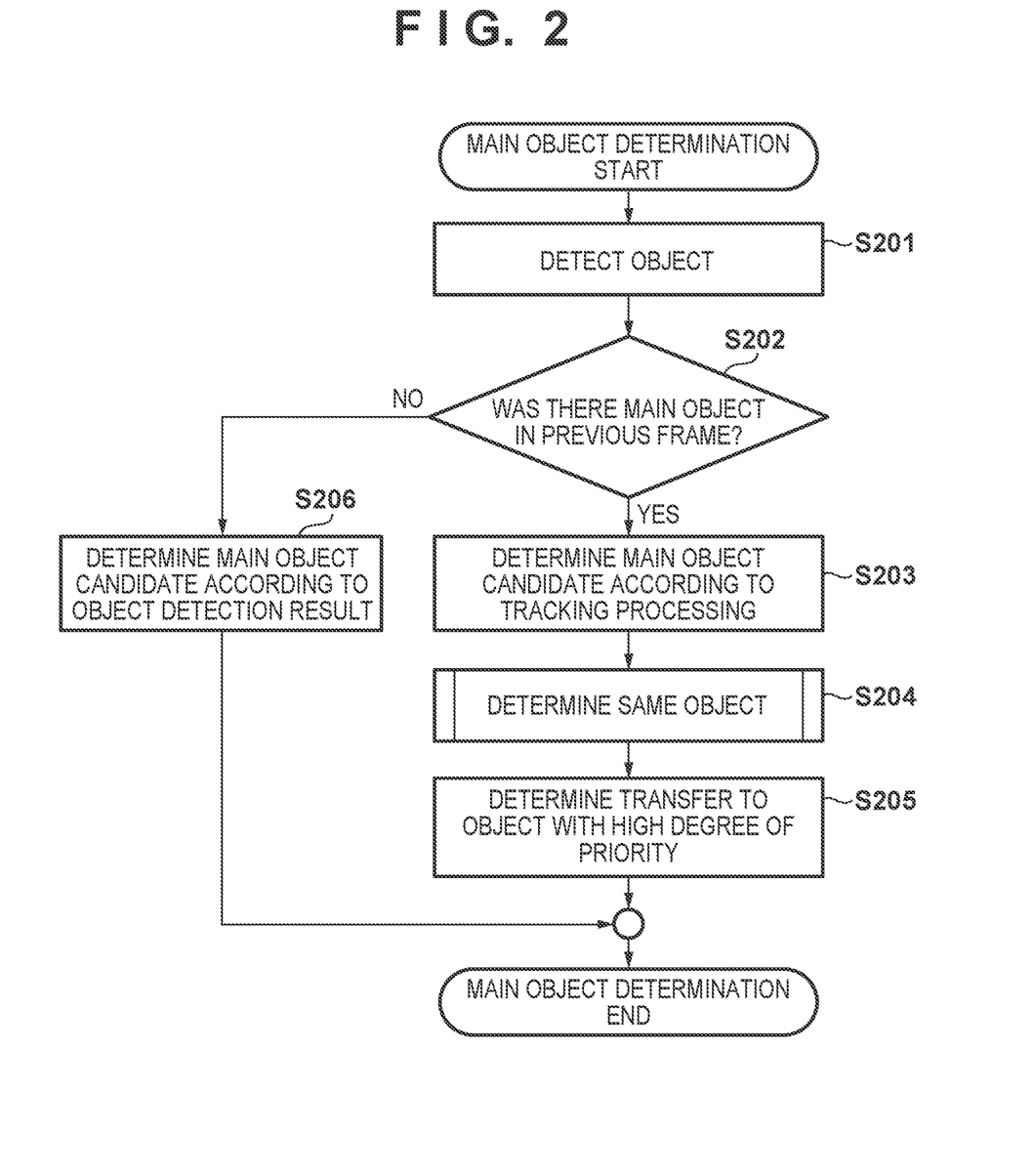
FIG. 2 is a flowchart showing operations for main object selection.

Next, main object selection processing that is performed by the object detection unit 123 according to the embodiment will be described with reference to the flowchart in FIG. 2. Here, the main object to be captured is selected with respect to information regarding the detected object and information regarding the object. Also, the image capturing device 108 performs image capturing at a frame rate of, for example, 30 frames per second, and FIG. 2 shows processing that is performed when one frame of image data is acquired.

In step S201, the object detection unit 123 references image data of the current frame processed by the image processing unit 110 to performs processing to detect the object. The object to be detected is, for example, a human's face or entire body, an animal's face or entire body, an object that is remarkable in the color/brightness thereof, or the like. The object detection unit 123 acquires information regarding the object to be detected, and the information regarding the object includes the type, position, size, reliability, and distance of the object to be detected. The detected object is to be used as a candidate for the main object.

In step S202, the object detection unit 123 determines whether or not the main object was present in the previous frame. Upon determining that the main object was present in the previous frame, the object detection unit 123 branches processing to step S203, and upon determining that the main object was not present, the object detection unit 123 branches processing to step S206.

In S203, the object detection unit 123 performs tracking processing to determine an object that is highly correlated with the main object in the previous frame, and determines a main object candidate in the image of the current frame. Thereafter, the object detection unit 123 advances processing to step S204.

In step S204, the object detection unit 123 performs same-object determination processing (described later with reference to FIGS. 3A to 3E, 4, 5A, and 5B), and advances processing to step S205. Here, upon determining that the object detected in step S201 is the same object with respect to the main object candidate determined in step S203, object detection unit 123 performs transfer according to the same-object determination, and determines the detected object as a main object candidate. When transfer according to the same-object determination is not to be performed, the main object candidate determined in step S203 is to be continuously used as a main object candidate.

In step S205, the object detection unit 123 determines whether or not an object with a higher degree of priority than the main object candidate set in step S203 is present, and ends the operation for selecting the main object. Here, if an object with a higher degree of priority is present, the object detection unit 123 determines the object with a higher degree of priority for the use as the main object, and if an object with a higher degree of priority is not present, the object detection unit 123 determines the main object candidate as the current main object. For example, the object detection unit 123 may determine that an object has a higher degree of priority for the use as the main object when the position thereof is closer to the center of the screen, the size there of is larger, the reliability thereof is higher, and the distance thereof to the camera is shorter. Also, the degree of priority of the type of the detected object such as a human or an animal, or the degree of priority of the detected part of the object such as the face or the entire body, may be set in advance.

Here, in an example of priority determination processing, if the user has set a high degree of priority to a human's face, when the human's face, the human's entire body, and an animal's face have been detected, the human's face is to be determined as having a high priority. Furthermore, when a plurality of human faces have been detected, evaluation values indicating the degrees of priority for the use as the main object are calculated based on object detection information, and thus the degrees of priority are compared with each other. For example, the evaluation value of a position that is based on the closeness to the center position of the screen and the evaluation value of the size that is based on the size of the face detection size may be calculated, and the evaluation value of the degree of priority may be calculated by multiplying the evaluation value of the position and the evaluation value of the size.

In step S206, the object detection unit 123 estimates the degrees of priority for the use as the main object, of the objects detected in step S201, as with the determination of the degree of priority in step S205, and determines the object with the highest priority for the use as the main object as the current main object, and ends the operation performed to select the main object.

Next, the details of processing for the same-object determination in step S204 in FIG. 2 will be described with reference to FIGS. 3A to 3E and 4.

The following three conditions are used in same-object determination according to the embodiment:

(1) Condition regarding the distance in the XY directions.
(2) Condition regarding the distance in the Z direction.
(3) Condition regarding the number of times the conditions regarding the distances in the XY directions and the Z direction are satisfied in a row.

First, "(1) Condition regarding the distance in the XY directions" will be described. Note that X and Y mentioned here are represented using the coordinates in a two-dimensional space in the horizontal and vertical directions in the image. "(1) Condition regarding the distance in the XY directions" is a condition regarding an overlap between the peripheral region of the main object candidate and the peripheral region of the transfer destination in same-object determination, in the coordinates of the two-dimensional space. In this regard, the determination is performed using threshold values of the distance corresponding to combinations of the type of the main object candidate and the type of the object at the transfer destination.

Figures 3A, 3B:
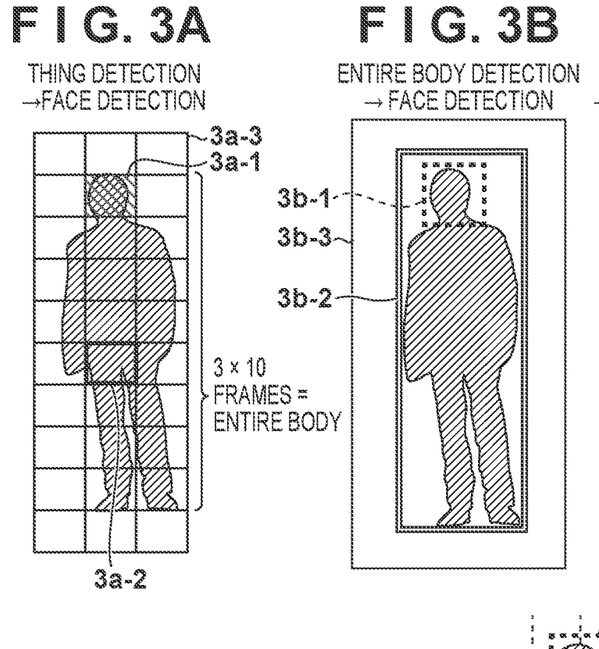
FIGS. 3A to 3E are conceptual diagrams showing determination conditions for same-object determination.

First, as shown in FIG. 3A, when the detection at the transfer destination is face detection (3a-1) and the detection at the main object candidate is a thing detection region (3a-2), if the object region (3a-3) estimated from the result of the face detection and the thing region (3a-2) of the main object candidate overlaps, the condition is satisfied because the relationship between their respective types and distances is reasonable. Here, as an example of the estimated object region (3a-3), the region of 3 frames×10 frames, where the face detection size corresponds to one frame, is estimated as the region of the entire body of the human. In the horizontal direction, the estimated region is set as the range that covers the torso by arranging three frames centered around the position of the face. In the vertical direction, a region that covers the entire body of the human is set as an estimated region by setting one frame on the face and setting eight frames below the face so as to cover the body to the bottom of the feet.

As shown in FIG. 3B, when the detection at the transfer destination is the face detection (3b-1) and the detection at the main object candidate is the entire-body detection (3b-2), if a region (3b-3) obtained by multiplying the entire-body detection region (3b-2) that is the main object candidate region by a predetermined number overlaps the face detection region (3b-1), it is determined that the condition is satisfied. When tracking is performed using the result of the detection of the entire body as the main object, the tracking tends to be unstable due to changes in the shape of the entire body. Therefore, it is possible to stabilize tracking by transferring the detection to face detection.

Figure 3C:
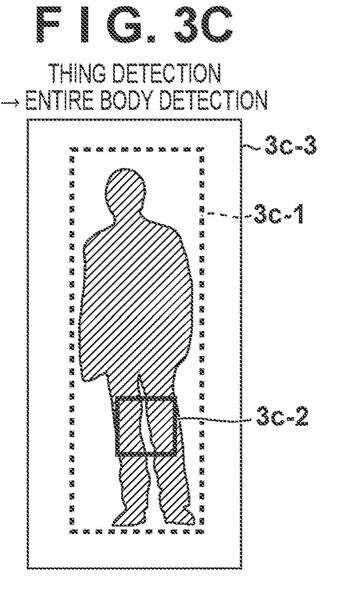

Next, as shown in FIG. 3C, when detection at the transfer destination is the entire-body detection (3c-1) and detection at the main object candidate is a thing detection region (3c-2), if the region (3c-3) obtained by multiplying the entire-body detection region (3c-1) by a predetermined number overlaps the main object candidate region (3c-2), it is determined that the condition is satisfied.

As a result of the above, for example, if a "face" cannot be detected during the tracking of a "face" as the main object, and, for example, if a part of the human other than the face thereof such as "body" is detected, and if it is located within the distance corresponding to the type of the detected object, it is determined that they are the same.

Figure 3D:
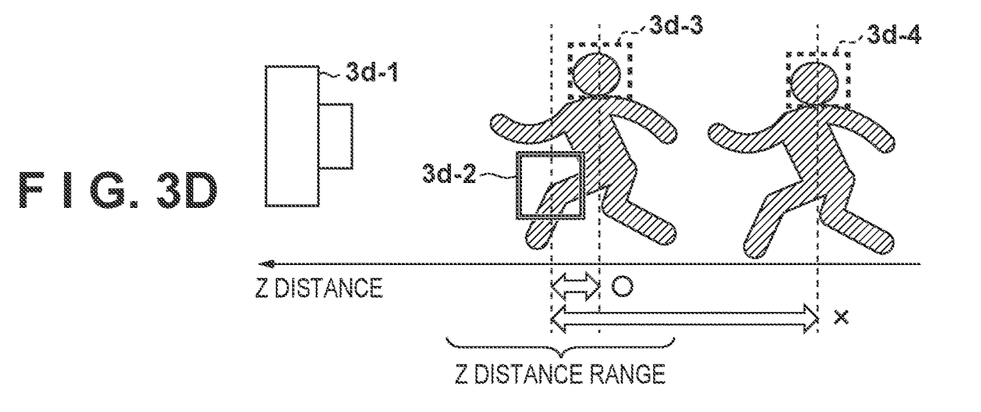

Next, "(2) Condition regarding the distance in the Z direction" will be described. Z mentioned here represents the distance from the image capturing apparatus. As shown in FIG. 3D, when the object candidate (3d-2) is captured by the image capturing apparatus (3d-1), the difference between the distance to the object candidate (3d-2) and the distance to the object at the transfer destination (3d-3) is obtained by the AF processing unit 105, and if the difference between the distances is within a predetermined range of the Z distance, it is determined that the condition is satisfied. In contrast, if the difference is out of the Z distance range, it is highly possible that the object is another object in the background or the foreground (3d-4), and it is determined that the condition regarding the same object is not satisfied.

Next, "(3) Condition regarding the number of times the conditions regarding the distances in the XY directions and the Z direction are satisfied in a row" will be described. This condition is provided to prevent another object that happens to pass by from being erroneously determined as the same object.

Figure 3E:
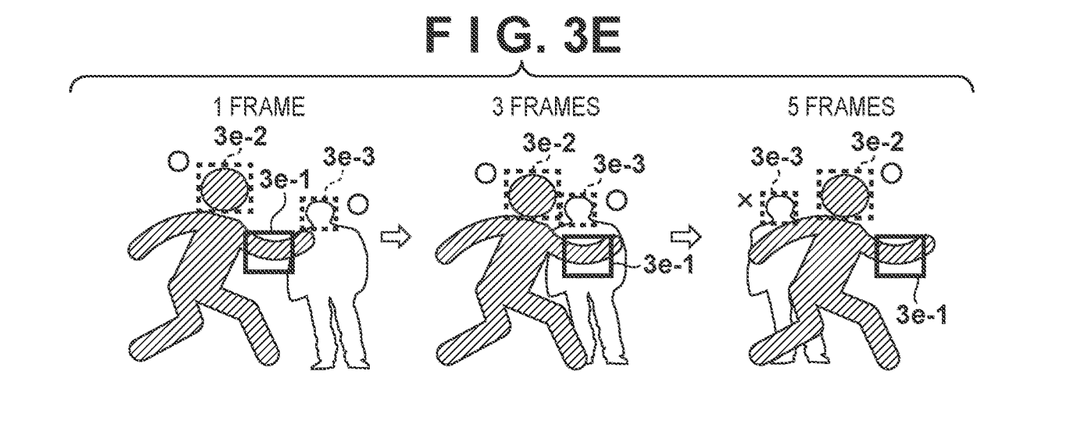

FIG. 3E shows changes in the detection position of the object and the tracking position of the main object candidate in the time series from the captured image in the first frame at which same-object determination is started to the captured image in the fifth frame. The following describes same-object determination processing performed when the consecutive number in "(3) Condition regarding the number of times the conditions regarding the distances in the XY directions and the Z direction are satisfied in a row" is "5" in this scene.

In the captured image in the first frame in FIG. 3E, there are a face detection region (3e-2) and a face detection region (3e-3) that satisfy "(1) Condition regarding the distance in the XY directions" and "(2) Condition regarding the distance in the Z direction" for the main object candidate (3e-1). The face detection region (3e-2) is the face detection region of the same object as the main object candidate (3e-1). The face detection region (3e-3) indicates an object different from the main object candidate (3e-1), but is present directly behind the main object candidate (3e-1) and the distance is very short. Therefore, it is impossible to use "(1) Condition regarding the distance in the XY directions" and "Condition regarding the distance in the Z direction" to determine whether or not the face detection region (3e-2) indicates another object.

In the captured image in the third frame in FIG. 3E, the position of the main object candidate (3e-1) has moved in the XY plane, and therefore the difference in the distance to the face detection area (3e-3) in the XY directions has changed. At this time, "(1) Condition regarding the distance in the XY directions" and "(2) Condition regarding the distance in the Z direction" are satisfied for the face detection region (3e-2) and the face detection region (3e-3). However, the current frame is the third frame from the beginning of the check of the conditions for the same-object determination, and therefore "(3) Condition regarding the number of times the conditions regarding the distances in the XY directions and the Z direction are satisfied in a row" is not satisfied. Therefore, the object is not determined as the same objects at this time.

In the captured image in the fifth frame in FIG. 3E, as a result of the tracking position of the main object candidate (3e-1) significantly moving in the XY plane, the face detection region (3e-3) does not satisfy "(1) Condition regarding the distance in the XY directions", and therefore it can be determined as not being the same object as the main object candidate (3e-1). In contrast, the face detection region (3e-2) satisfies "(1) Condition regarding the distance in the XY directions" and "(2) Condition regarding the distance in the Z direction" in five frames in a row, and satisfies "(3) Condition regarding the number of times the conditions regarding the distances in the XY directions and the Z direction are satisfied in a row". Therefore, it can be correctly determined as the same object.

As described above, in a scene where it is difficult to distinguish between different objects according to "(1) Condition regarding the distance in the XY directions" and "(2) Condition regarding the distance in the Z direction", it is possible to perform correct determination according to "(3) Condition regarding the number of times the conditions regarding the distances in the XY directions and the Z direction are satisfied in a row".

Figure 4:
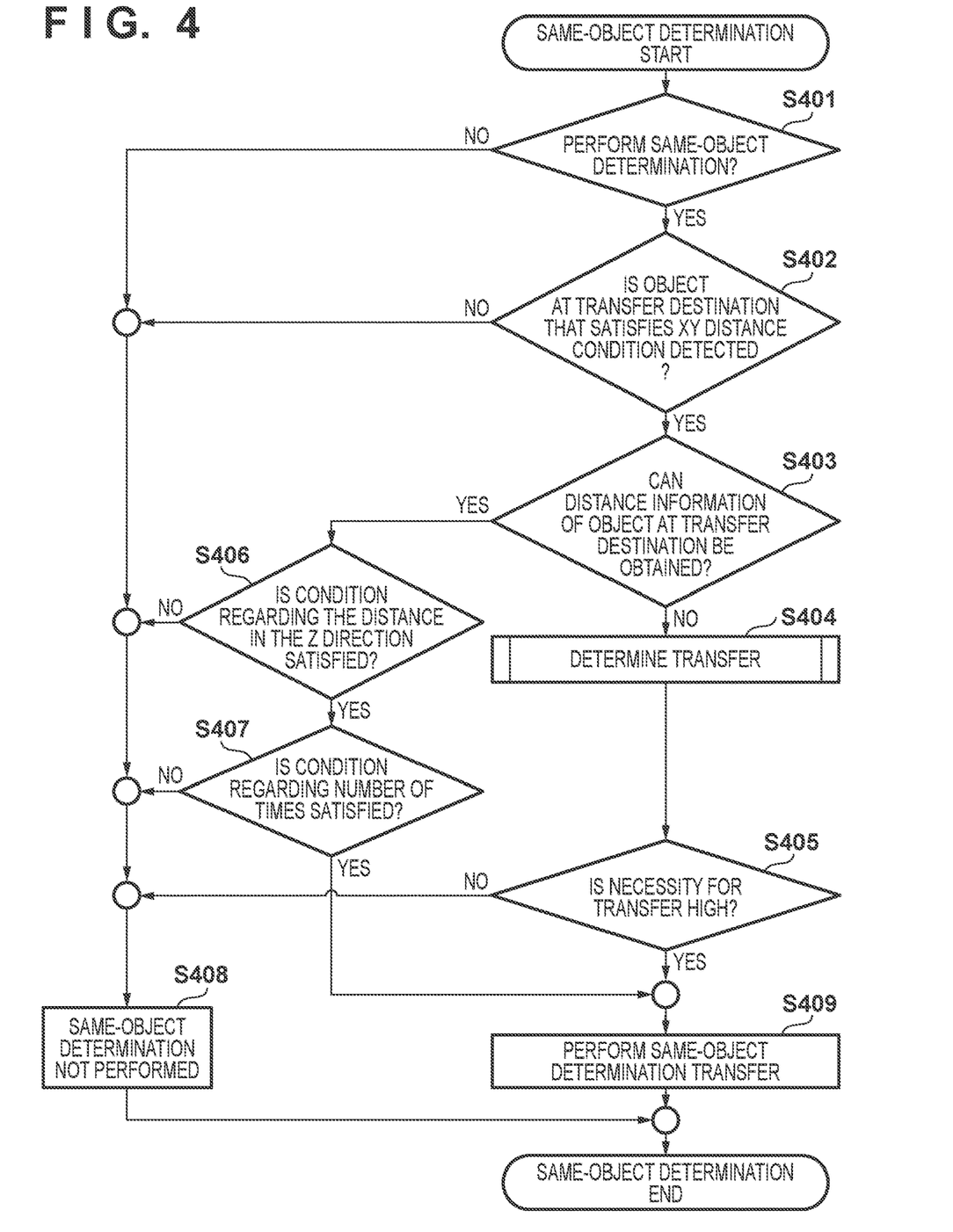
FIG. 4 is a flowchart showing operations for same-object determination according to a first embodiment.

Next, the flow of operations for the same-object determination in step S204 in FIG. 2 will be described with reference to FIG. 4. Here, the conditions for same-object determination have been checked, whether or not to perform the same-object determination is determined according to the degree of necessity of performing transfer to the object at the destination of the same-object determination.

In step S401, the object detection unit 123 checks whether or not the main object candidate determined in step S203 in FIG. 2 is the object to be subjected to the same-object determination. Upon determining that the object is to be subjected to the same-object determination, the object detection unit 123 branches processing to step S402, and upon determining that the object is not to be subjected to the same-object determination, the object detection unit 123 branches processing to step S408. For example, when a human's face is targeted as a transfer destination according to the same-object determination, detection of a thing or the entire body of the human that can be the same object as the face is set as the subject of the same-object determination, and main object candidates that cannot be the same object as the human's face, such as a human's face, an animal's face, and the entire body of an animal, are excluded. In addition, if whether or not to perform the same-object determination has been changed or the transfer destination of the same-object determination has been changed according to menu settings, whether or not to perform the same-object determination may be determined according to the menu settings.

In step S402, the object detection unit 123 determines whether or not there is an object that is to be the transfer destination and that satisfies "(1) Condition regarding the distance in the XY directions" described with reference to FIGS. 3A to 3E at the transfer destination for the previous main object. Upon determining that there is an object that is to be the transfer destination, the object detection unit 123 branches processing to step S403, and upon determining that there is no such an object, the object detection unit 123 branches processing to step S408.

In step S403, the object detection unit 123 determines whether or not the AF processing unit 105 has successfully acquired distance information regarding the object at the transfer destination determined in step S402. Upon determining that distance information has not been successfully acquired, the object detection unit 123 branches processing to S404, and upon determining that distance information has been successfully acquired, the object detection unit 123 branches processing to S406.

In step S404, the object detection unit 123 performs transfer determination processing, which will be described later with reference to FIGS. 5A, 5B, and 6, and advances processing to step S405.

In step S405, the object detection unit 123 determines whether the necessity for transfer according to the transfer determination in step S404 is high or low. Upon determining that the necessity for transfer is high, the object detection unit 123 branches processing to step S409, and upon determining that the necessity is low, the object detection unit 123 branches processing to step S408.

In step S406, the object detection unit 123 determines whether or not the object at the transfer destination satisfies the "condition regarding the distance in the Z direction" described with reference to FIGS. 3A to 3E. Upon determining that this condition is satisfied, the object detection unit 123 branches processing to step S407, and upon determining that this condition is not satisfied, the object detection unit 123 branches processing to step S408.

In step S407, the object detection unit 123 determines whether or not the object at the transfer destination has satisfied "(1) Condition regarding the distance in the XY directions" and "(2) Condition regarding the distance in the Z direction" described with reference to FIGS. 3A to 3E at least a predetermined number of times in a row. Upon determining that "(1) Condition regarding the distance in the XY directions" and "(2) Condition regarding the distance in the Z direction" have been satisfied the predetermined number of times in a row, the object detection unit 123 branches processing to step S409, and upon determining that the conditions have not been satisfied the predetermined number of times in a row, the object detection unit 123 branches processing to step S408.

Figure 5A:
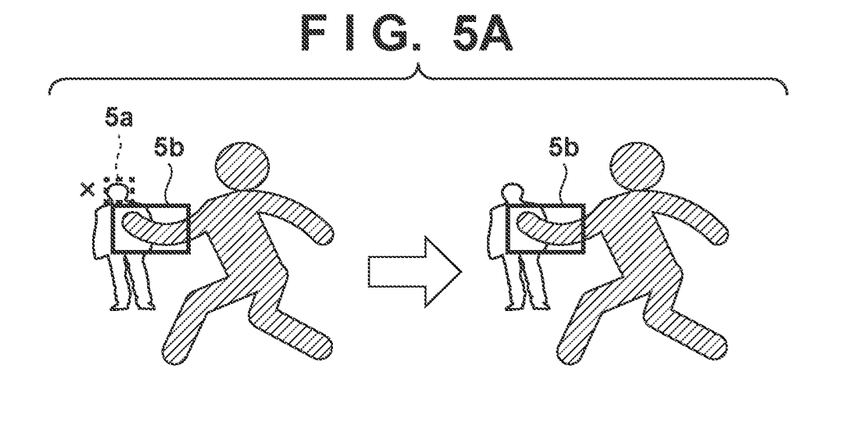
FIGS. 5A and 5B are conceptual diagrams showing operations for same-object determination.

In step S408, the object detection unit 123 keeps the previous main object as a main object candidate, and, as shown in FIG. 5A, if the result of the face detection (5a) at the transfer destination and the main object candidate (5b) have not been determined as the same objects, the object detection unit 123 keeps the object candidate (5b) as the main object candidate.

Figure 5B:
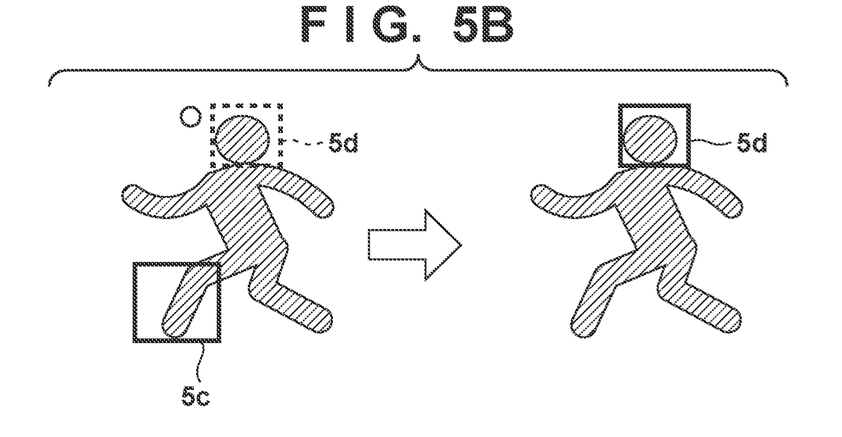

In step S409, the object detection unit 123 determines the object at the transfer destination as a main object candidate, and as shown in FIG. 5B, if the result of the face detection (5c) at the transfer destination and the main object candidate (5d) have been determined as the same objects, the object detection unit 123 transfers the main object candidate to the result of face detection (5c).

Next, the transfer determination processing in step S404 in FIG. 4 will be described with reference to FIGS. 5A, 5B, and 6.

The object detection unit 123 determines the necessity of transfer based on the combination of the following three conditions.

(1) Amount of movement of the main object candidate
(2) Tracking reliability of the main object candidate
(3) AF reliability of the main object candidate Regarding "(1) Amount of movement of the main object candidate", the presence or absence of movement is determined based on whether or not the amount of change in the position of the main object in time series has exceeded a predetermined threshold value. For example, when the main object is determined in step S206 in FIG. 2, the difference from the position of the previous object may be constantly calculated and stored, and the presence or absence of movement may be determined based on the average value of a predetermined number of main object determinations performed in the past.

Regarding "(2) Tracking reliability of the main object candidate", when the main object is determined in step S206 in FIG. 2, the reliability of the object acquired from the object detection unit 123 is stored, and reliability regarding whether or not the main object is being correctly tracked is determined stepwise based on whether or not the reliability has exceeded a predetermined threshold value.

Regarding "(3) AF reliability of the main object candidate", reliability regarding whether or not AF is being correctly performed on the main object is determined stepwise based on whether or not the reliability of AF, acquired from the AF processing unit 105, has exceeded a predetermined threshold.

Figure 6:
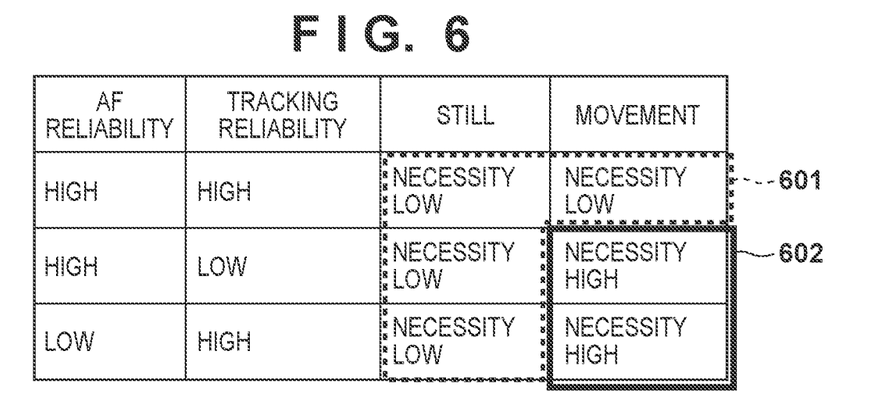
FIG. 6 is a diagram showing operations for transfer determination.

As shown in FIG.6, the degree of necessity of transfer is determined based on the combination of the results of determination according to (1) to (3) above.

Figure 7A:
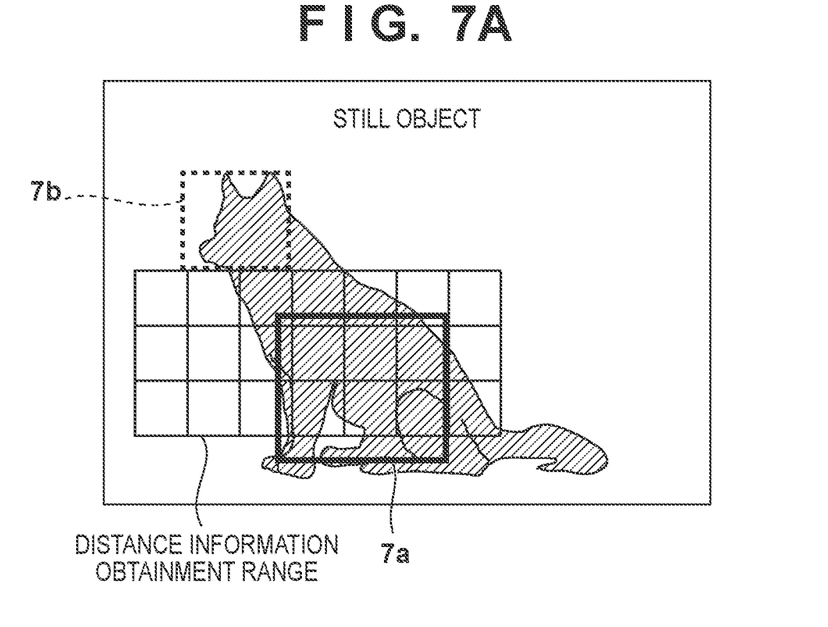
FIGS. 7A and 7B are conceptual diagrams showing operations for transfer determination.

For example, in FIG. 7A, the main object candidate indicated by the reference numeral 7a is a still object, the tracking reliability and AF reliability thereof are high, and this object is satisfactorily tracked. Therefore, as indicated by the range drawn with the dotted line indicated by the reference numeral 601 in FIG. 6, the necessity of transfer to the result of the face detection at the transfer destination indicated by the reference numeral 7b is low.

Figure 7B:
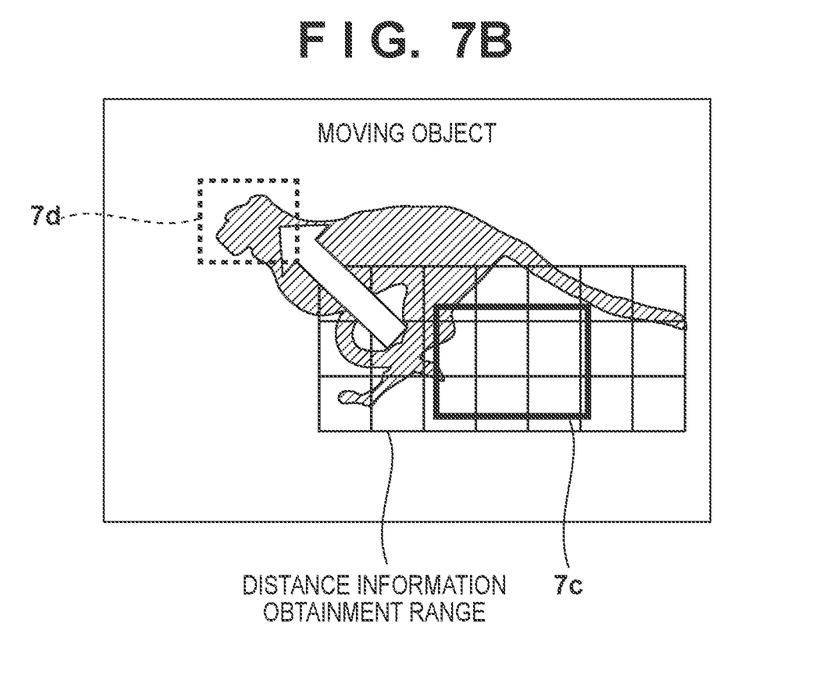

Next, in FIG. 7B, the main object candidate indicated by the reference numeral 7c is moving, the tracking reliability and AF reliability thereof are low, and it is difficult to track this object. As indicated by the range drawn with the solid line indicated by the reference numeral 602 in FIG. 6, the necessity to the transfer to the face detection at the transfer destination indicated by the reference numeral 7d is high, and transfer to another main object is to be performed if there is an object that satisfies the conditions for the same-object determination other than (2) Condition regarding the distance in the Z direction.

As described above, according to the first embodiment, even when distance information regarding the object cannot be acquired, it is possible to determine the necessity of transfer through same-object determination. Upon determining that the necessity of transfer is high, it is possible to perform transfer to an object that satisfies the conditions for same-object determination, thereby continuously tracking the object targeted by the user to keep the quality of frame display.

Second Embodiment

A same-object determination according to a second embodiment, shown in step S204 in FIG. 2, will be described with reference to FIG. 8. Note the apparatus configuration is the same as that in FIG. 1 of the first embodiment, and the description thereof will be omitted.

In step S801, the object detection unit 123 checks whether or not the main object candidate determined in step S203 in FIG. 2 is the object to be subjected to the same-object determination. Upon determining that the object is to be subjected to the same-object determination, the object detection unit 123 branches processing to step S802, and otherwise branches processing to step S808. For example, when a human's face is targeted as a transfer destination according to the same-object determination, the object detection unit 123 sets detection of a thing or the entire body of the human that can be the same object as the face as the subject of the same-object determination, and excludes main object candidates that cannot be the same object as the human's face, such as a human's face, an animal's face, and the entire body of an animal. In addition, if whether or not to perform the same-object determination has been changed or the transfer destination of the same-object determination has been changed according to menu settings, whether or not to perform the same-object determination may be determined according to the menu settings.

In step S802, the object detection unit 123 determines whether or not an object that satisfies "(1) Condition regarding the distance in the XY directions" described for a main object candidate with reference to FIGS. 3A to 3E is present. Upon determining that an object that satisfies "(1) Condition regarding the distance in the XY directions" is present, the object detection unit 123 branches processing to step S803, and upon determining that such an object is not present, the object detection unit 123 branches processing to step S809.

In step S803, the object detection unit 123 determines whether or not distance information regarding the object that satisfies "(1) Condition regarding the distance in the XY directions" in step S802 has been acquired by the AF processing unit 105. Upon determining that the distance information has been required by the AF processing unit 105, the object detection unit 123 branches processing to step S807, and upon determining that the distance information has not been acquired, the object detection unit 123 branches processing to step S804.

In step S804, the object detection unit 123 performs the transfer determination processing described with reference to FIGS. 5A, 5B, and 6. Thereafter, the object detection unit 123 advances processing to step S805. Here, conditions for same-object determination will be described with reference to FIGS. 9A and 9B.

Figure 9A:
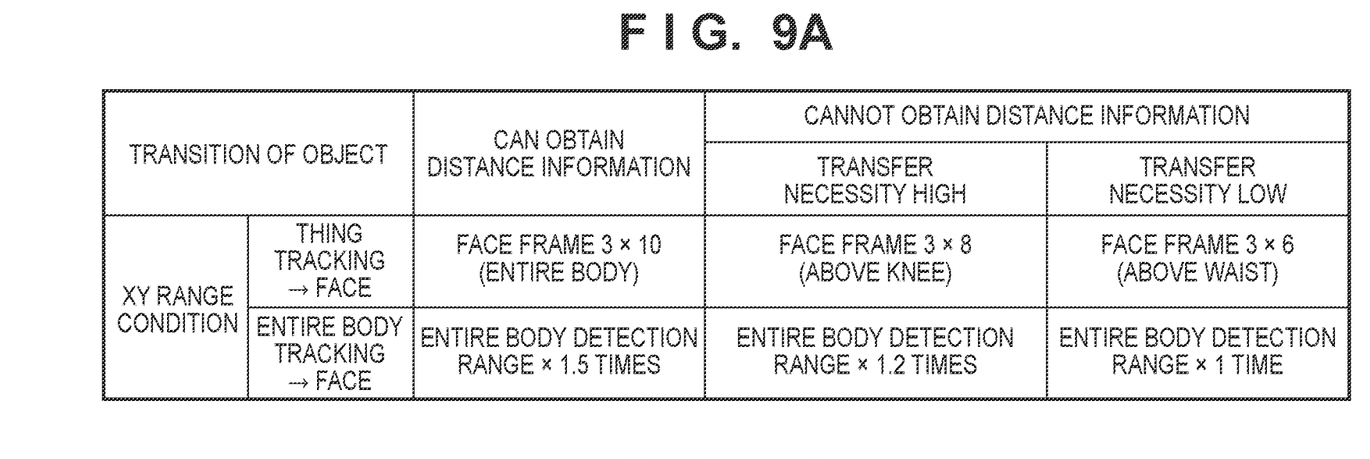
FIGS. 9A and 9B are diagrams showing determination conditions for same-object determination according to the second embodiment.

FIG. 9A shows specific examples of "(1) Condition regarding the distance in the XY directions" according to the second embodiment. Regarding the case in which distance information in the Z direction (the depth direction for the image capturing apparatus) can be acquired, the range in which the same object can be present is set as a condition with a margin, with reference to the transfer destination object according to the same-object determination. However, regarding the case in which distance information in the Z direction, the range to be set as a condition for the distance in the XY directions is limited considering the risk of transferring to another object because it is impossible to distinguish the object from another object that is adjacent to the object in the XY direction at a distance.

Regarding the case in which the necessity of transfer is low, the range to be set as a condition for the distance in the XY directions is further limited to be narrow, placing more importance on avoiding the risk of transferring to another object, compared to the case in which the necessity of transfer is high.

Figure 9B:
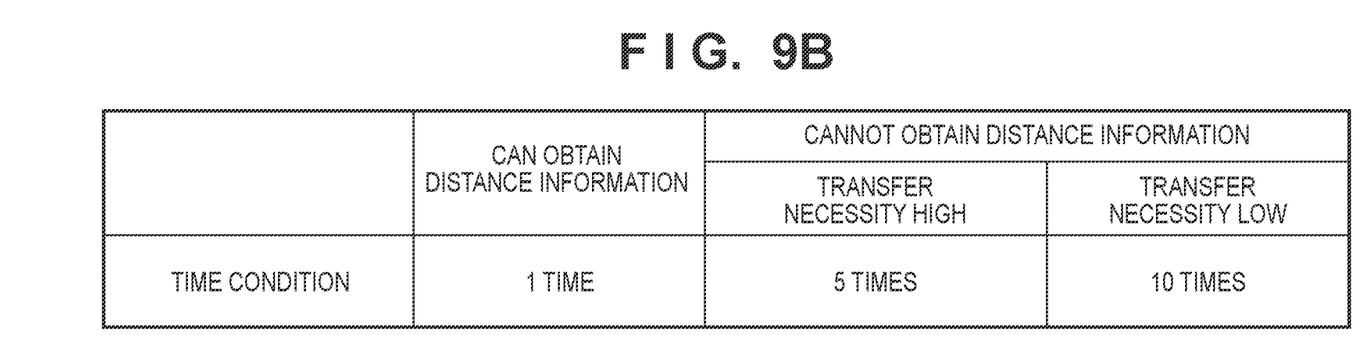

FIG. 9B shows specific examples of "(3) Condition regarding the number of times the conditions regarding the distances in the XY directions and the Z direction are satisfied in a row". However, when distance information can be acquired from a portion of the screen of when the distance in the Z direction cannot be acquired due to a poor AF accuracy, "(2) Condition regarding the distance in the Z direction" is excluded from the conditions.

As described with reference to FIG. 9A, when the distance information in the Z direction cannot be required, the value of the condition regarding the number of times is increased so that another object that is adjacent to the object in the XY direction at a distance is temporarily prevented from being determined as the same object because it is impossible to distinguish the object from another object that is adjacent to the object at a distance. Regarding the case in which the necessity of transfer is low, the value of the condition regarding the number of times is set to be even larger, placing more importance on avoiding the risk of transferring to another object, compared to the case in which the necessity of transfer is high.

Figure 8:
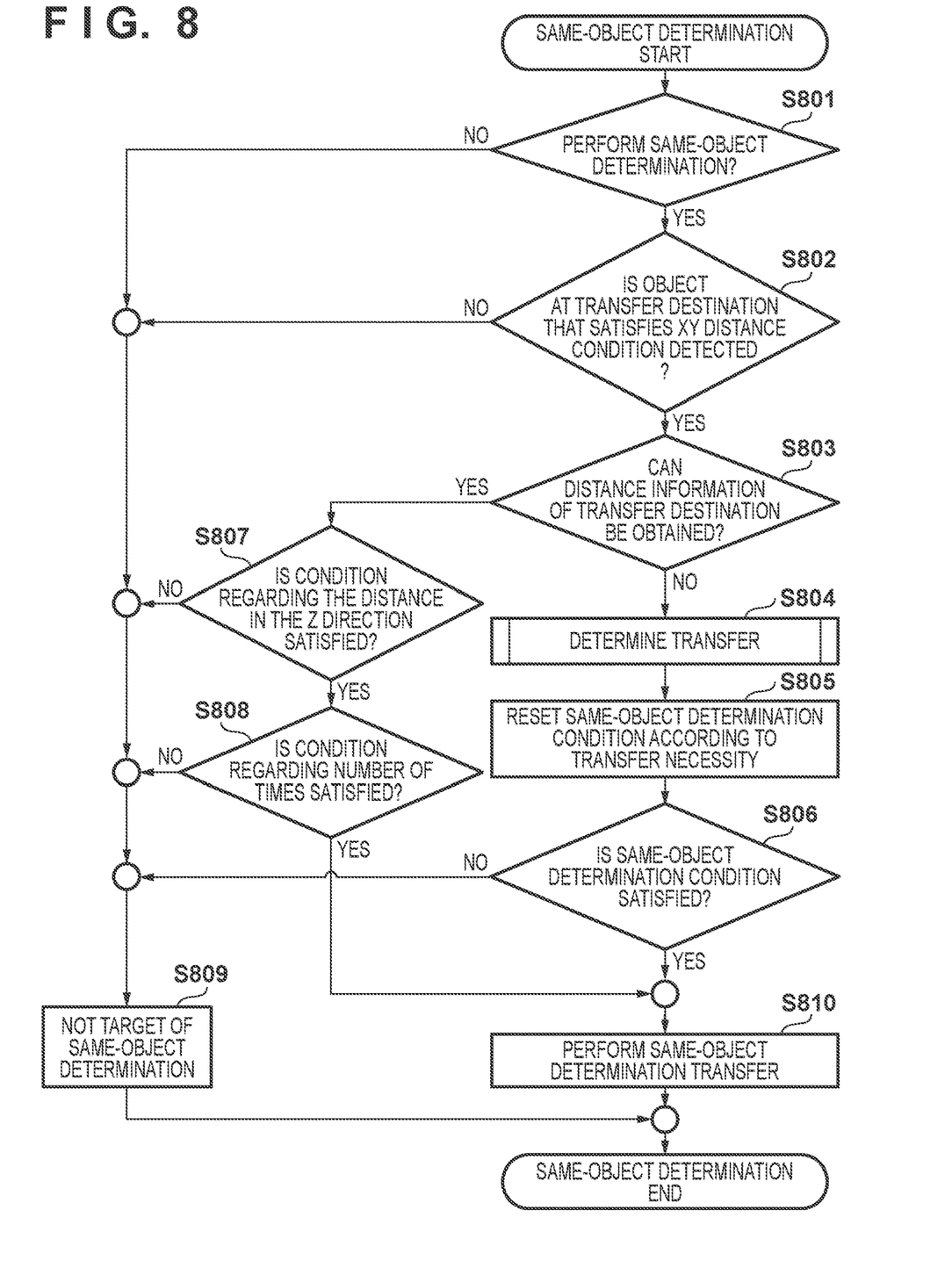
FIG. 8 is a flowchart showing operations for same-object determination according to a second embodiment.

FIG. 8 will be further described. In step S806, the object detection unit 123 determines whether or not the conditions for the same-object determination are satisfied based on the conditions for the same-object determination set in step S805. Upon determining that the conditions for the same-object determination are satisfied, the object detection unit 123 branches processing to step S810, and upon determining that the conditions for the same-object determination are not satisfied, the object detection unit 123 branches processing to step S809.

In step S807, the object detection unit 123 determines whether or not the object at the transfer destination satisfies "(2) Condition regarding the distance in the Z direction" described with reference to FIGS. 3A to 3E. Upon determining that the object at the transfer destination satisfies "(2) Condition regarding the distance in the Z direction", the object detection unit 123 branches processing to step S808, and upon determining that the object at the transfer destination does not satisfy the condition, the object detection unit 123 branches processing to step S809.

In step S808, the object detection unit 123 determines whether or not the "(1) Condition regarding the distance in the XY directions" and "(2) Condition regarding the distance in the Z direction" are satisfied at least a predetermined number of times in a row. Upon determining that the condition regarding the number of times is satisfied, the object detection unit 123 branches processing to step S810, and upon determining that the condition is not satisfied, the object detection unit 123 branches processing to step S809.

In step S809, the object detection unit 123 continuously keeps the main object candidate as the main object candidate, and terminates the operations for same object determination.

In step S810, the object detection unit 123 determines the object at the transfer destination as the main object candidate, and terminates the operations for same object determination.

As described above, according to the second embodiment, even when distance information regarding the object cannot be acquired, it is possible to perform same object determination according to the necessity of transfer through same-object determination, thereby continuously tracking the object targeted by the user to keep the quality and reliability of frame display.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-102514, filed Jun. 12, 2020, which is hereby incorporated by reference herein in its entirety.

What is claimed is:

1. An apparatus having a capturing unit for capturing an image at a predetermined frame rate, the apparatus comprising:

a processor; and a memory storing instructions to be executed by the processor, wherein the instructions, when read and executed by the processor, causes the processor to function as:
a detection unit configured to detect an object that is a candidate as a candidate object for a main object, from an image in a current frame acquired by the capturing unit; and
an object determination unit configured to determine whether or not the candidate object is the same as the main object, and if the candidate object is the same as the main object, the candidate object is determined to be the main object in the current frame,
wherein the object determination unit includes:
a first determination unit that determines whether or not the main object is present in the previous frame;
a second determination unit that, if the first determination unit determines that the main object is present in the previous frame, determines whether or not coordinates of the candidate object in the current frame in a two-dimensional space on an image and coordinates of the main object in the previous frame satisfy a distance condition that is based on respective types of the objects;
a third determination unit that, if the first determination unit determines that the main object is present in the previous frame, determines whether or not a difference between the candidate object in the current frame and the main object in the previous frame, in a distance direction from the apparatus, is within a predetermined range; and
a fourth determination unit that determines whether or not the second determination unit and the third determination unit have determined in the affirmative a predetermined number of times, and
the object determination unit
determines that a candidate object with a highest degree of priority among candidate objects detected from the current frame by the detection unit is the main object if the first determination unit determines that the main object is not present in the previous frame;
determines that, if the fourth determination unit determines that the second determination unit and the third determination unit have determined in the affirmative the predetermined number of times, transfer of the main object has occurred; and
determines that, if the fourth determination unit determines that either the second determination unit or the third determination unit determines in the negative, a candidate object with a highest degree of priority among the candidate objects detected from the current frame by the detection unit is the main object.

2. The apparatus according to claim 1, wherein the detection unit detects at least one of a face of a human, a body of a human, an animal, or a thing.

3. The apparatus according to claim 1,
wherein the object determination unit further includes a fifth determination unit that, if the second determination unit determines affirmative regarding the distance condition and the third determination unit is unable to acquire distance information for obtaining the distance from the apparatus, obtains necessity of transfer based on an amount of a change in the main object in time series in a two-dimensional space, reliability of the main object, and autofocus (AF) reliability, and determines whether or not to perform transfer of the main object according to the necessity.

4. The apparatus according to claim 1,
wherein the object determination unit further includes setting unit for, in response to the third determination unit is unable to acquire the distance information regarding the candidate, setting a distance condition for the second determination unit and a condition regarding the predetermined number of times for the fourth determination unit.

5. The apparatus according to claim 1, wherein the priority is determined based of one of the size and the position of the object in the captured image and a distance of the object from the capturing unit.

6. A method for controlling an apparatus having a capturing unit for capturing an image at a predetermined frame rate, the method comprising:
(a) detecting an object that is a candidate for a main object as a candidate object, from an image in a current frame acquired by the capturing unit; and
(b) determining whether or not the candidate object is the same as the main object, and if the candidate object is the same as the main object, the candidate object is determined to be the main object in the current frame,
wherein the determining (b) includes:
(b-1) determining whether or not the main object is present in the previous frame;
(b-2) in response to the determining (b-1) determines that the main object is present in the previous frame, determining whether or not coordinates of the candidate object in the current frame in a two-dimensional space on an image and coordinates of the main object in the previous frame satisfy a distance condition that is based on respective types of the objects;
(b-3) in response to the determining (b-1) determines that the main object is not present in the previous frame, determining whether or not a difference between the candidate object in the current frame and the main object in the previous frame, in a distance direction from the apparatus, is within a predetermined range;
(b-4) determining whether or not the determinings (b-2) and (b-3) have determined in the affirmative a predetermined number of times;
(b-5) in response to the determining (b-1) determines that the main object is not present in the previous frame, determining that a candidate object with a highest degree of priority among candidate objects detected from the current frame in the detecting is the main object;
(b-6) in response to the determining (b-4) determines that the determinings (b-2) and (b-3) have determined in the affirmative the predetermined number of times, determining that transfer of the main object has occurred; and
(b-7) in response to the determining (b-4) determines that either the determining (b-2) or determining (b-3) has determined in negative, determining that a candidate object with a highest degree of priority among candidate objects detected from the current frame is the main object.

7. The method according to claim 6, wherein the detecting (a) detects at least one of a face of a human, a body of a human, an animal, or a thing.

8. The method according to claim 6, further comprising:
(c) obtaining, in response to the determining (b-2) determines affirmative regarding the distance condition and the determining (b-3) is unable to acquire distance information for obtaining the distance from the apparatus, necessity of transfer based on an amount of a change in the main object in time series in a two-dimensional space, reliability of the main object, and autofocus (AF) reliability; and (d) determining whether or not to perform transfer of the main object according to the necessity.

9. The method according to claim 6, further comprising (e) setting, in response to the determining (b-3) is unable to acquire the distance information regarding the candidate, a distance condition and a condition regarding the predetermined number of times for determinings (b-2) and (b-4).

10. The method according to claim 6, wherein the priority is determined based of one of the size and the position of the object in the captured image and a distance of the object from the capturing unit.

11. A non-transitory computer-readable storage medium storing a program which, when read and executed by a processor in an apparatus having a capturing unit for capturing an image at a predetermined frame rate, causes the apparatus to execute a method for controlling the apparatus, the method comprising:

(a) detecting an object that is a candidate as a candidate object for a main object, from an image in a current frame acquired by the capturing unit; and (b) determining whether or not the candidate object is the same as the main object, and if the candidate object is the same as the main object, the candidate object is determined to be the main object in the current frame, wherein the determining (b) includes:

(b-1) determining whether or not the main object is present in the previous frame;

(b-2) in response to the determining (b-1) determines that the main object is present in the previous frame, determining whether or not coordinates of the candidate object in the current frame in a two-dimensional space on an image and coordinates of the main object in the previous frame satisfy a distance condition that is based on respective types of the objects;

(b-3) in response to the determining (b-1) determines that the main object is present in the previous frame, determining whether or not a difference between the candidate object in the current frame and the main object in the previous frame, in a distance direction from the apparatus, is within a predetermined range;

(b-4) determining whether or not the determinings (b-2) and (b-3) have determined in the affirmative a predetermined number of times;

(b-5) in response to the determining (b-1) determines that the main object is not present in the previous frame, determining that a candidate object with a highest degree of priority among candidate objects detected from the current frame is the main object;

(b-6) in response to the determining (b-4) determines that the determinings (b-2) and (b-3) have determined in the affirmative the predetermined number of times, determining that transfer of the main object has occurred; and (b-7) in response to the determining (b-4) determines that either the determining (b-2) or the determining (b-4) has determined in negative, determining that a candidate with a highest degree of priority among candidate objects detected from the current frame is the main object.

12. The non-transitory computer-readable storage medium according to claim 11, wherein the detecting (a) detects at least one of a face of a human, a body of a human, an animal, or a thing.

13. The non-transitory computer-readable storage medium according to claim 11, further comprising:

(c) obtaining, in response to the determining (b-2) determines affirmative regarding the distance condition and the determining (b-3) is unable to acquire distance information for obtaining the distance from the apparatus, necessity of transfer based on an amount of a change in the main object in time series in a two-dimensional space, reliability of the main object, and autofocus (AF) reliability; and (d) determining whether or not to perform transfer of the main object according to the necessity.

14. The non-transitory computer-readable storage medium according to claim 11, further comprising (e) setting, in response to the determining (b-3) is unable to acquire the distance information regarding the candidate, a distance condition and a condition regarding the predetermined number of times for determinings (b-2) and (b4).

15. The non-transitory computer-readable storage medium according to claim 11, wherein the priority is determined based of one of the size and the position of the object in the captured image and a distance of the object from the capturing unit.

* * * * *